(12) United States Patent
Akiyama et al.

(10) Patent No.: US 8,020,268 B2
(45) Date of Patent: *Sep. 20, 2011

(54) PRECISION ROLL TURNING LATHE

(75) Inventors: Takanobu Akiyama, Numazu (JP); Satoshi Kato, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/762,524

(22) Filed: Jun. 13, 2007

(65) Prior Publication Data

US 2008/0011132 A1    Jan. 17, 2008

(30) Foreign Application Priority Data

Jun. 15, 2006  (JP) .................................. 2006-166404

(51) Int. Cl.
*B23P 23/02* (2006.01)
*B23B 29/24* (2006.01)
*B23B 29/32* (2006.01)

(52) U.S. Cl. .................. 29/40; 82/159; 82/121; 82/129; 29/55

(58) Field of Classification Search ..................... 82/121, 82/123, 124, 131, 132, 137, 139, 153, 154, 82/159, 142, 148; 29/39, 40, 55, 27 C; 408/35
See application file for complete search history.

(56) References Cited

U.S. PATENT DOCUMENTS

| 1,417,521 | A | | 5/1922 | Haumann | |
|---|---|---|---|---|---|
| 1,949,512 | A | | 3/1934 | Norton | |
| 2,028,293 | A | * | 1/1936 | O'Brien et. al. | ............. 409/327 |
| 2,222,206 | A | * | 11/1940 | Stone et. al. | ...................... 29/46 |

(Continued)

FOREIGN PATENT DOCUMENTS

CN    2541118    3/2003

(Continued)

OTHER PUBLICATIONS

Office Action issued in U.S. Appl. No. 11/762,511 mailed Mar. 10, 2009.

(Continued)

*Primary Examiner* — Boyer D Ashley
*Assistant Examiner* — Sara Addisu
(74) *Attorney, Agent, or Firm* — DLA Piper LLP US (57) ABSTRACT

There is provided a precision roll turning lathe which can machine with high precision a three-dimensional pattern of three-sided pyramids or four-sided pyramids in the surface of a roll. The precision roll turning lather includes: a bed; a headstock, mounted on the bed, having a main spindle for rotating a roll as a workpiece while holding one end of the roll by means of a chuck; a tail stock, mounted on the bed and disposed opposite the headstock, for rotatably supporting the other end of the roll; a carriage including a saddle mounted on the bed movably in the longitudinal direction (Z-axis direction) of the roll, and a table mounted on the saddle movably in a direction (X-axis direction) perpendicular to the longitudinal direction of the roll; a tool swivel mounted on the table; a tool post mounted on the tool swivel and having a plurality of cutting tools attached thereto; a C-axis control means for performing control for carrying out circumferential indexing of the roll and control for continuously rotating the main shaft at a predetermined rotating speed; and a switching means for selective switching between the roll-indexing control and the control of continuous rotation of the main spindle.

9 Claims, 9 Drawing Sheets

U.S. PATENT DOCUMENTS

| | | | |
|---|---|---|---|
| 2,354,411 A | | 7/1944 | Thompson |
| 2,378,261 A | | 6/1945 | Turney |
| 2,534,333 A | * | 12/1950 | Wyrick .......................... 74/824 |
| 2,559,138 A | | 7/1951 | Waterson |
| 2,682,698 A | * | 7/1954 | Berthiez .......................... 29/40 |
| 2,760,397 A | | 8/1956 | Arpon |
| 3,017,697 A | | 1/1962 | Wlodek |
| 3,125,931 A | | 3/1964 | Stanaback |
| 3,159,065 A | | 12/1964 | Diener |
| 3,449,985 A | * | 6/1969 | Eaves et. al. .................... 408/10 |
| 3,703,112 A | * | 11/1972 | Selby .............................. 82/127 |
| 3,841,805 A | | 10/1974 | Zalis |
| 3,985,049 A | | 10/1976 | Streckfus |
| 3,996,454 A | | 12/1976 | Froyd |
| 4,225,273 A | | 9/1980 | Womack |
| 4,266,276 A | | 5/1981 | Hayashi et al. |
| 4,461,121 A | * | 7/1984 | Motzer et al. ..................... 451/5 |
| 4,617,503 A | | 10/1986 | Davis et al. |
| 4,617,764 A | | 10/1986 | Reibakh |
| 4,766,788 A | | 8/1988 | Yashiki et al. |
| 4,833,764 A | * | 5/1989 | Muller .............................. 29/40 |
| 4,840,095 A | | 6/1989 | Nussbaumer et al. |
| 4,876,931 A | | 10/1989 | Bertini |
| 5,152,202 A | * | 10/1992 | Strauss ........................... 82/134 |
| 5,197,228 A | * | 3/1993 | Sharkey et al. ................... 451/5 |
| 5,222,283 A | * | 6/1993 | Laschet ........................ 29/27 C |
| 5,289,622 A | | 3/1994 | Minagawa |
| 5,946,991 A | | 9/1999 | Hoopman |
| 5,964,016 A | * | 10/1999 | Ito et al. ........................ 29/27 C |
| 6,040,653 A | | 3/2000 | O'Neill |
| 6,075,221 A | | 6/2000 | Minhas |
| 6,457,391 B1 | | 10/2002 | Yamazaki et al. |
| 6,865,789 B2 | | 3/2005 | Katoh et al. |
| 6,868,304 B2 | | 3/2005 | Uehara et al. |
| 6,945,147 B2 | | 9/2005 | Sakashita |
| 6,952,627 B2 | | 10/2005 | Olczak et al. |
| 7,089,836 B2 | * | 8/2006 | Kato et al. ..................... 82/1.11 |
| 7,240,412 B2 | | 7/2007 | Sasazawa et al. |
| 7,266,871 B2 | * | 9/2007 | Takeuchi et al. ............. 29/27 C |
| 7,441,484 B1 | | 10/2008 | Larsen et al. |
| 2002/0008899 A1 | | 1/2002 | Tanaka et al. |
| 2002/0082742 A1 | | 6/2002 | Kadono |
| 2004/0003690 A1 | * | 1/2004 | Katoh et al. .................... 82/121 |
| 2004/0045419 A1 | | 3/2004 | Bryan |
| 2004/0050222 A1 | | 3/2004 | Sakashita |
| 2004/0187654 A1 | * | 9/2004 | Kato et al. ..................... 82/1.11 |
| 2007/0042160 A1 | | 2/2007 | Nakajima |
| 2007/0251360 A1 | | 11/2007 | Akiyama |
| 2007/0295175 A1 | | 12/2007 | Akiyama |

FOREIGN PATENT DOCUMENTS

| | | |
|---|---|---|
| CN | 1491765 | 4/2004 |
| CN | 1736659 | 2/2006 |
| DE | 2935829 | 8/1980 |
| EP | 0403842 | 12/1990 |
| JP | 59-024943 A | 2/1984 |
| JP | 01-177924 A | 7/1989 |
| JP | 04-283003 | 10/1992 |
| JP | 11033801 | 2/1999 |
| JP | 2001-328002 | 11/2001 |
| JP | 2001-336596 | 12/2001 |
| JP | 2002-079401 | 3/2002 |
| JP | 2002-160133 | 6/2002 |
| JP | 2002160133 A * | 6/2002 |
| JP | 2002-346803 | 12/2002 |
| JP | 2003-94239 | 4/2003 |
| JP | 2004-223836 | 8/2004 |
| JP | 2004-344916 | 12/2004 |
| JP | 2004-345062 | 12/2004 |
| JP | 2004-358624 | 12/2004 |
| JP | 2004-368624 | 12/2004 |
| JP | 2005-022058 | 1/2005 |
| JP | 2005-537944 | 12/2005 |
| JP | 2006-130066 | 5/2006 |
| JP | 2006-135560 | 5/2006 |
| JP | 2006-156388 | 6/2006 |
| JP | 2006-165144 | 6/2006 |
| JP | 2006-166404 | 6/2006 |
| JP | 2007-320022 | 12/2007 |
| KR | 0251794 | 4/2000 |
| SU | 1227375 | 4/1986 |
| SU | 1741981 | 6/1992 |
| SU | 1815012 | 5/1993 |
| TW | M278500 | 10/2005 |
| WO | WO 2004-024421 | 3/2004 |

OTHER PUBLICATIONS

Chinese Office Action issued in Application No. 200710138845.7 mailed Mar. 6, 2009.
English Translation of Chinese Office Action issued in Application No. 200710138845.7 mailed Mar. 6, 2009.
English Language Translation of Office Action issued in TW Appl 096121380 dated Aug. 26, 2009.
Office Action issued in TW Appl 096121380 dated Aug. 26, 2009.
English Language Translation of Office Action issued in TW Appl 096121381 dated Aug. 26, 2009.
Office Action issued in TW Appl 096121381 dated Aug. 26, 2009.
English Language Abstract of JP 2003 94239 published Apr. 3, 2003.
English Language Abstract of JP 2004 358624 published Dec. 24, 2004.
Office Action issued in Korean Application 10-2007-0057853 dated Oct. 19, 2009.
English Translation of Office Action issued in Korean Application 10-2007-0057853 dated Oct. 19, 2009.
English Language Abstract of KR 0251794 issued Apr. 15, 2000.
Partial Capture of Image File Wrapper of U.S. Appl. No. 11/762,511 from Jul. 12, 2010 to Aug. 9, 2010.
Image File Wrapper of U.S. Appl. No. 12/062,931 from Aug. 10, 2010 to Jan. 28, 2011.
Image File Wrapper of U.S. Appl. No. 11/739,884 from Aug. 10, 2010 to Jan. 28, 2011.
Image File Wrapper of U.S. Appl. No. 12/503,970 from Aug. 10, 2010 to Jan. 28, 2011.
Image File Wrapper of U.S. Appl. No. 11/762,511 from Aug. 10, 2010 to Jan. 28, 2011.
Final Office Action issued in U.S. Appl. No. 11/762,511 mailed Sep. 5, 2008.
Office Action Issued in Counterpart Korean Application No. 10-2007-0040936, Mailed Mar. 27, 2008.
English language translation of Korean Office Action issued in Application No. 10-2007-0040936, mailed Mar. 27, 2008.
English language abstract of JP 2002-160133, published Jun. 4, 2002.
English language abstract of JP 2005-022058, published Jan. 27, 2005.
Machine English language translation of JP 2002-160133, published Jun. 4, 2002.
Machine English language translation of JP 2005-022058, published Jan. 27, 2005.
Office Action issued in U.S. Appl. No. 11/739,884 mailed Oct. 28, 2008.
Office Action issued in U.S. Appl. No. 11/762,511 mailed Jan. 7, 2008.
Advisory Action issued in U.S. Appl. No. 11/762,511 mailed Dec. 29, 2008.
Form PTO 892 issued in U.S. Appl. No. 11/762,511 on Dec. 16, 2008.
Chinese Office Action issued in Application No. 200710138844.2 mailed Feb. 27, 2009.
English Language Translation of Chinese Office Action issued in Application No. 200710138844.2 mailed Feb. 27, 2009.
Office Action issued in U.S. Appl. No. 11/739,884 mailed Apr. 30, 2009.
English Language Abstract of JP 2004-344916 published Dec. 9, 2004.
Machine translation of JP 2004-344916 published Dec. 9, 2004.
English Language Translation of Chinese Office Action in CN Appl 2008-10090587.4 on Sep. 4, 2009.
Chinese Office Action in CN Appl 2008-10090587.4 on Sep. 4, 2009.
English Language Abstract of JP 2004-223836 published Aug. 12, 2004.

English Translation of Office Action issued in Korean Appl 10-2008-0031455 on Dec. 18, 2009.
Office Action issued in Korean Appl 10-2008-0031455 on Dec. 18, 2009.
English Abstract of JP Publication 04-283003 published Oct. 8, 1992.
English Abstract of JP Publication 2005-537944 published Dec. 15, 2005.
English machine translation of JP Publication 2005-537944 published Dec. 15, 2005.
English language abstract of JP 2004-358624, published Dec. 24, 2004.
Machine English language translation of JP 2004-358624, published Dec. 24, 2004.
English language abstract of JP 2006-130066, published May 25, 2006.
Machine English language translation of JP 2006-130066, published May 25, 2006.
English language abstract of JP 2006-135560, published May 25, 2006.
Machine English language translation of JP 2006-135560, published May 25, 2006.
English language abstract of JP 2006-156388, published Jun. 15, 2006.
Machine English language translation of JP 2006-156388, published Jun. 15, 2006.
English language abstract of JP 2006-165144, published Jun. 22, 2006.
Machine English language translation of JP 2006-165144, published Jun. 22, 2006.
English language abstract of JP 2006-166404, published Jun. 22, 2006.
Machine English language translation of JP 2006-166404, published Jun. 22, 2006.
Image File Wrapper of U.S. Appl. No. 12/062,931 captured Jun. 14, 2010.
Image File Wrapper of U.S. Appl. No. 11/739,884 captured Jun. 14, 2010.
Image File Wrapper of U.S. Appl. No. 11/762,511 captured Jun. 14, 2010.
Image File Wrapper of U.S. Appl. No. 12/503,970 captured Jun. 14, 2010.
Korean Offiice Action issued in Application No. 10-2007-0040936 mailed Dec. 12, 2008.
Translation of Korean Offiice Action issued in Application No. 10-2007-0040936 mailed Dec. 12, 2008.
Korean Offiice Action issued in Application No. 10-2007-0057853 mailed Dec. 12, 2008.
Translation of Korean Offiice Action issued in Application No. 10-2007-0057853 mailed Dec. 12, 2008.
Korean Offiice Action issued in Application No. 10-2007-0058393 mailed Dec. 12, 2008.
Translation of Korean Office Action issued in Application No. 10-2007-0058393 mailed Dec. 12, 2008.
Image File Wrapper of U.S. Appl. No. 11/739,884 as of Jul. 12, 2010.
Office Action issued in Japanese Application No. 2006-123626 on Sep. 10, 2010.
English translation of Office Action issued in Japanese Application No. 2006-123626 on Sep. 10, 2010.
English Language Abstract of JP 59-024943A, published Feb. 8, 1984.
English Language Abstract of JP 01-177924A, published Jul. 14, 1989.
Amendment filed in U.S. Appl. No. 12/062,931 on Oct. 12, 2010.
English Abstract of JP 11033801 published Feb. 9, 1999.
English Translation of JP 11033801 published Feb. 9, 1999.
Office Action issued in Korean Appl 10-2009-65152 on Mar. 30, 2011.
English Translation of Office Action issued in Korean Appl 10-2009-65152 on Mar. 30, 2011.
English Abstract of JP 2002-346803 published Dec. 4, 2002.
English Translation of JP 2002-346803 published Dec. 4, 2002.
English Abstract of JP 2007-320022 published Dec. 13, 2007.
English Translation of JP 2007-320022 published Dec. 13, 2007.
Office Action issued in JP 2006-166404 on Mar. 29, 2011.
English Language Translation of Office Action issued in JP 2006-166404 on Mar. 29, 2011.
English Abstract of JP 2001-336596 published Dec. 7, 2011.
English Translation of JP 2001-336596 published Dec. 7, 2011.
Office Action issued in U.S. Appl. No. 12/062,931 on Apr. 12, 2011.
Notice of Allowance issued in U.S. Appl. No. 11/739,884 on May 12, 2011.

* cited by examiner

PRECISION ROLL TURNING LATHE

BACKGROUND OF THE INVENTION

1. Field of the Invention

The present invention relates to a precision roll turning lathe which can machine a three-dimensional pattern, consisting of three-sided or four-sided pyramids arranged in a matrix, in the peripheral surface of a roll.

2. Background Art

Roll grinders and roll turning lathes are generally used as machine tools for machining rolls. A roll grinder includes a headstock, a tail stock, and a carriage which is provided with a grinding wheel.

Such a roll grinder can carry out grinding with a grinding wheel of the peripheral surface of a roll and, in addition, machining of grooves in the peripheral surface. Japanese Patent Laid-Open Publication No. 2003-94239 describes a roll grinder which is provided, in its carriage, with a groove-machining device having a cutting saw blade for groove cutting.

A roll turning lathe is a lathe in which a tool post, having e.g. diamond tools attached thereto, is mounted in a carriage, and is basically used for machining circumferential grooves on a roll by rotating the roll with a headstock and feeding the carriage in the lateral direction (X-axis direction) of the roll. When machining axial grooves on a roll, the carriage is moved at a high speed in the longitudinal direction (Z-axis direction) of the roll while indexing the roll with the headstock (C axis), thereby producing the axial grooves.

The recent progress of machine control technology has realized ultraprecision machining with a lathe, and it has become possible to machine even with a lathe a mold for molding an optical lens. For example, the applicant has proposed a vertical lathe capable of machining a mold for molding of a Fresnel lens (Japanese Patent Laid-Open Publication No. 2004-358624). The vertical lathe can machine with high precision V-shaped lens grooves of a mold for molding of a Fresnel lens.

Owing to the widespread use of liquid crystal displays, there is an increasing demand for lens sheets for use in a backlight of a liquid crystal panel. Such lens sheets include, besides the above-mentioned Fresnel lens, a lenticular lens sheet, a cross lenticular lens sheet, a prism sheet, etc.

Molding a lenticular lens sheet, a cross lenticular lens sheet or a prism sheet by extrusion molding using a transfer roll has recently been studied.

In the case of a transfer roll for the production of a lenticular lens sheet, it is only necessary to machine with precision circumferential grooves at a predetermined pitch in the peripheral surface of the roll. Such machining is possible even with a conventional common roll turning lathe.

On the other hand, in the case of a transfer roll for a cross lenticular lens sheet or a prism sheet, it is necessary to machine a three-dimensional pattern of four-side pyramids or three-sided pyramids on the roll.

For machining of a pattern of four-sided pyramids, cutting of circumferential grooves and axial grooves in a matrix pattern in the surface of a roll is being studied. As regards machining of a pattern of three-sided pyramids, a method is being studied which involves machining axial grooves in combination with spiral grooves in the peripheral surface of a roll.

Conventional roll turning lathes, however, fail to successfully perform ultraprecision machining of such grooves. For example, the headstock of a conventional roll turning lathe, while capable of rotating a roll by means of a motor, does not have both of a roll-rotating function and a roll-indexing function. The conventional lathe thus is incapable of machining axial grooves on a roll.

Though high-precision machining of spiral grooves on a roll is needed to machine a pattern of three-sided pyramids on the roll, there has been no roll turning lathe capable of high-precision screw cutting.

SUMMARY OF THE INVENTION

It is therefore an objet of the present invention to solve the above problems in the prior art and provide a precision roll turning lathe which can machine with high precision a three-dimensional pattern of three-sided pyramids or four-sided pyramids in the surface of a workpiece.

In order to achieve the object, the present invention provides a precision roll turning lathe comprising: a bed; a headstock, mounted on the bed, having a main spindle for rotating a workpiece while holding one end of the workpiece by means of a chuck; a tail stock, mounted on the bed and disposed opposite the headstock, for rotatably supporting the other end of the workpiece; a carriage including a saddle mounted on the bed movably in the longitudinal direction (Z-axis direction) of the workpiece, and a table mounted on the saddle movably in a direction (X-axis direction) perpendicular to the longitudinal direction of the workpiece: a tool swivel mounted on the table; a tool post mounted on the tool swivel and having a plurality of cutting tools attached thereto; a C-axis control means for serving both as a control means for carrying out indexing of the workpiece in the circumferential direction and a control means for continuously rotating the main shaft at a predetermined rotating speed; and a switching mean; for selective switching between the workpiece-indexing control and the control of continuous rotation of the main spindle.

The roll turning lathe of the present invention can not only machine with high precision transverse grooves (circumferential grooves) on a workpiece by continuously rotating the workpiece with the headstock, but can also machine with high precision longitudinal grooves (axial grooves) on a workpiece while circumferentially and evenly indexing the workpiece with the headstock. When machining spiral grooves in combination with longitudinal grooves on a workpiece, the headstock can index a machining start position for each spiral groove, and the spiral grooves can be machined by continuously rotating the workpiece at a precise rotating speed while feeding the carriage. With the provision of such a headstock, the roll tuning lathe of the present invention enables precision machining on a workpiece of a pattern of three-sided or four-sided pyramids arranged in a matrix.

DETAILED DESCRIPTION OF THE PREFERRED EMBODIMENTS

Preferred embodiments of the present invention will now be described with reference to the drawings.

Figure 1:
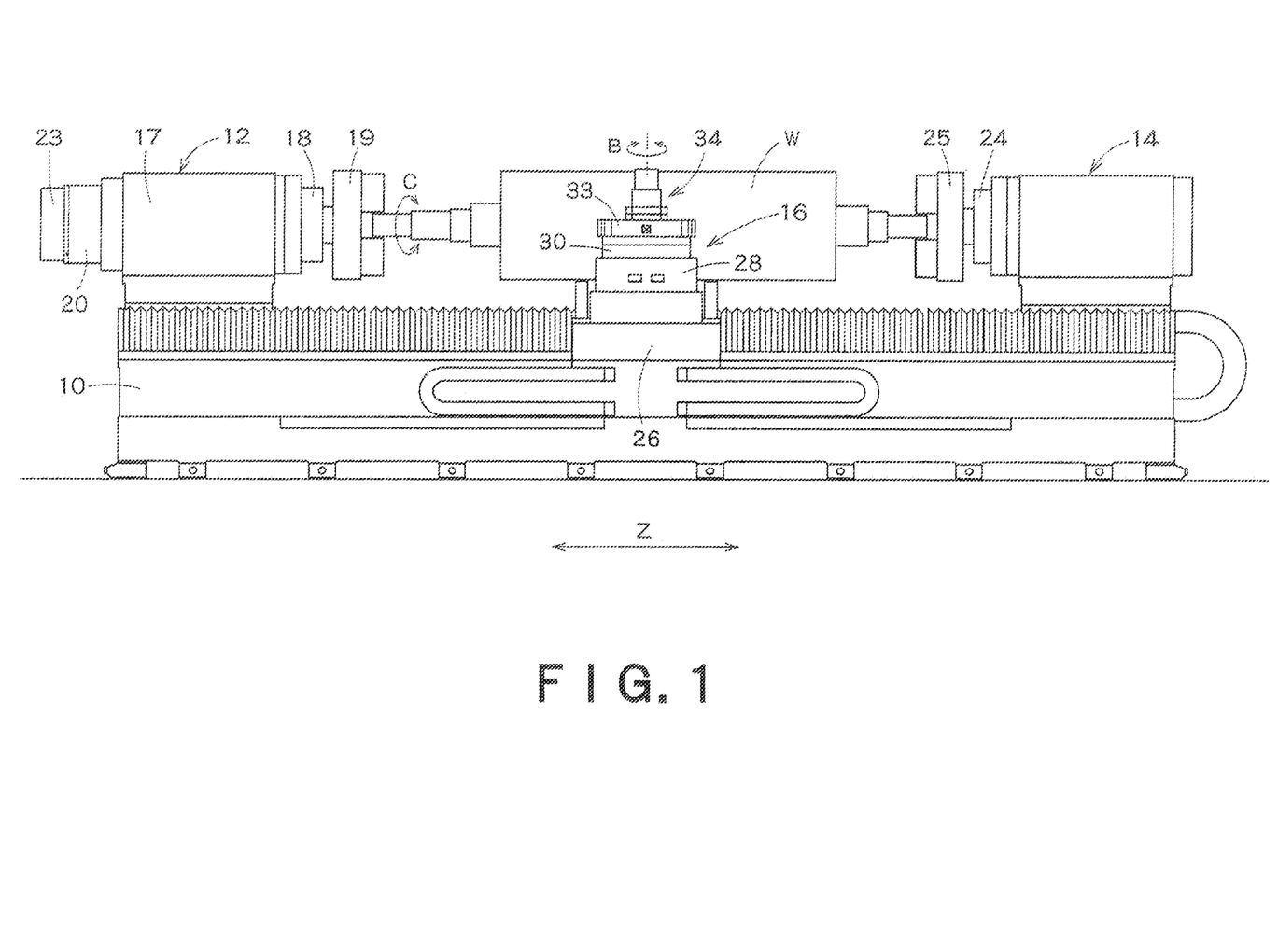
FIG. 1 is a side view of a precision roll turning lathe according to an embodiment of the present invention.
Figure 2:
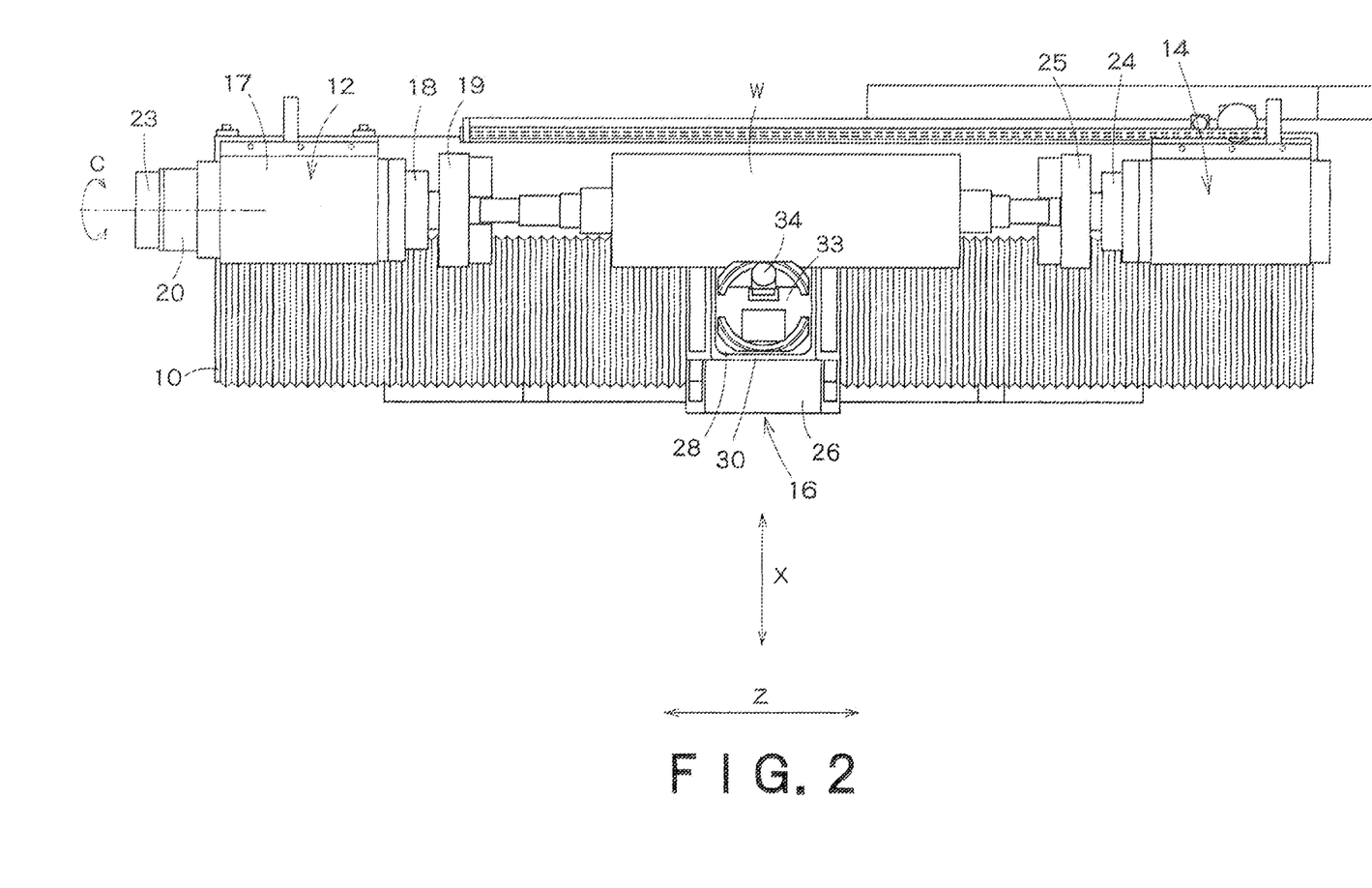
FIG. 2 is a plan view of the precision roll turning lathe.

FIG. 1 is a side view of a precision roll turning lathe according to an embodiment of the present invention, and FIG. 2 is a plan view of the precision roll turning lathe.

In FIGS. 1 and 2, the reference numeral 10 denotes a bed. On the bed 10 are mounted a headstock 12, a tail stock 14 and a carriage 16. A workpiece W is rotatably supported by the headstock 12 and the tail stock 14. As illustrated in FIGS. 1 and 2, the workpiece W can have a substantially cylindrical shape, such as that of a roll, for example.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is supported by a hydrostatic oil bearing (not shown) provided within the body 17. The chuck 19 holds a spindle of the workpiece W and transmits the rotation of the main spindle 18 to the workpiece W.

Figure 3:
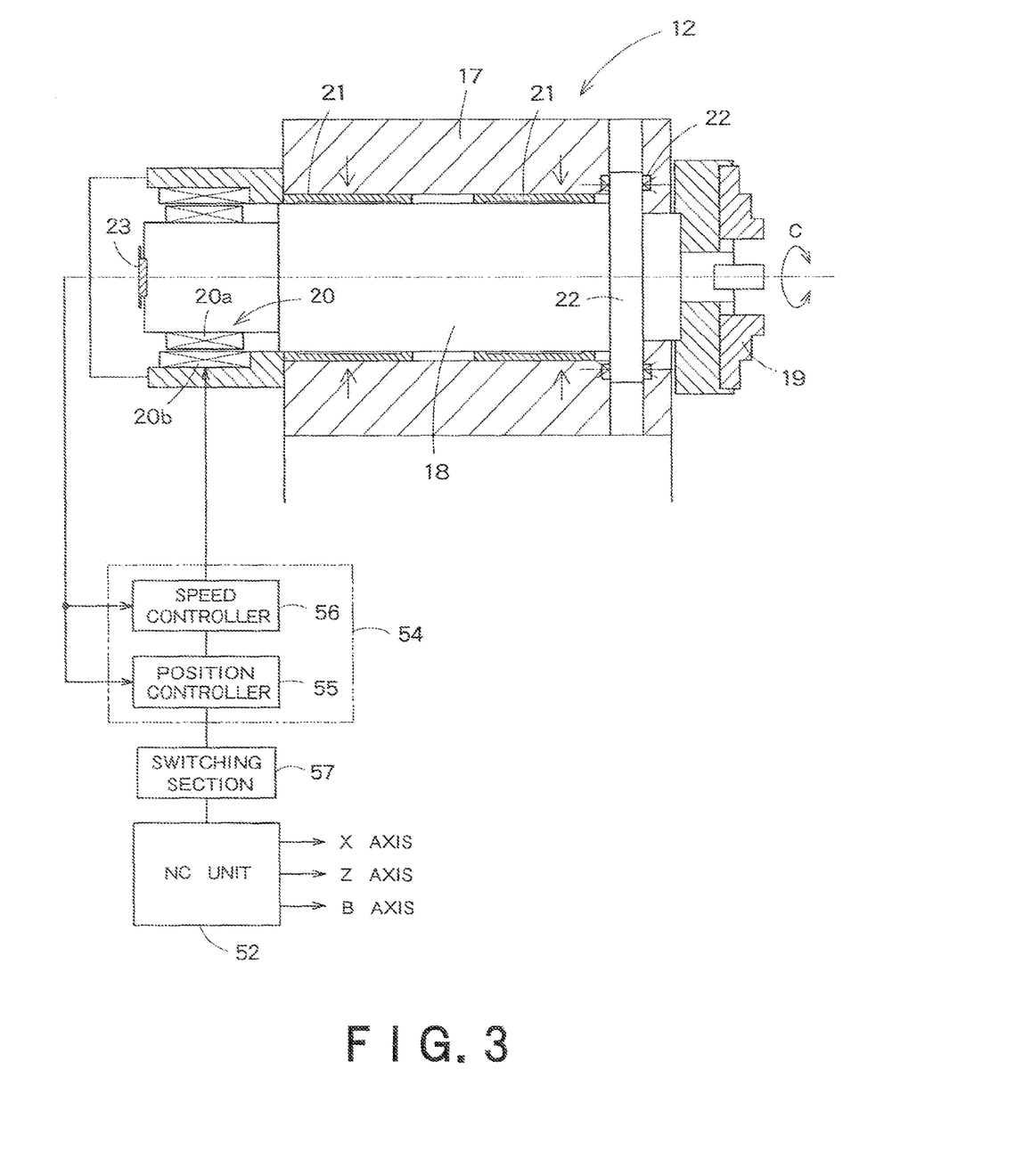
FIG. 3 is a longitudinal section view of the headstock of the precision roll turning lathe.

FIG. 3 shows a longitudinal section through the headstock 12. The main spindle 18 is rotatably supported by a radial bearing 21 and a thrust bearing 22 within the body 17. In this embodiment gaps of about 50 μm are formed between the radial bearing 21 and the peripheral surface of the main spindle 18 and between the thrust bearing 22 and a flange portion of the main spindle 18. The radial bearing 21 and the thrust bearing 22 support a radial load and a thrust load of the main spindle 18, respectively, by means of a pressurized oil as shown by the arrows, thus constituting a hydrostatic oil bearing. It is also possible to use, instead of such a hydrostatic oil bearing, an air bearing which supports a thrust load and a radial load by means of the pressure of high-pressure air.

In the headstock 12, a rotor 20a, which is in sliding engagement with a stator 20b, is mounted to the rear end of the main spindle 18. The servo motor 20 for driving the main spindle 18 thus is a built-in servo motor that directly drives the main spindle 18. The revolutions of the main spindle 18 are detected with an encoder 23. The detection signal of the encoder 23 is fed back to perform position control and/or speed control of the main spindle 18. The headstock 12 thus can function as an indexing axis (C axis) to perform circumferential indexing of the workpiece W and can also function to continuously rotate the main spindle 18 at a constant rotating speed (up to several hundred revolutions per minute).

Referring to FIGS. 1 and 2, the tail stock 14 is disposed on the bed 10 and opposite to the headstock 12. A guide surface (not shown) is provided on the upper surface of the bed 10 so that the tail stock 14 can be moved along the guide surface. The tail stock 14 has a main spindle 24 instead of a conventional common tail spindle, and rotatably supports a spindle of the workpiece W by means of a chuck 25 mounted to the main shaft 24. Such a tail stock 14 basically has the same construction as the headstock 12 except for having no servo motor.

A description will now be given of the carriage 16.

The carriage 16 includes a saddle 26 mounted on the bed 10 movably in the axial direction of the workpiece W. On the saddle 26 is mounted a table 28 movably in a direction perpendicular to the axial direction of the workpiece W. In the precision roll turning lather of the embodiment, the axis along which the saddle 26 is fed is termed Z axis, and the axis along which the table 28 is fed on the saddle 26 is termed X axis. In addition to the X axis and the Z axis, the headstock 12 has the C axis and a tool swivel 30, mounted on the table 28, has a B axis. The precision roll turning lathe thus is a four-axis control machine tool.

Figure 4:
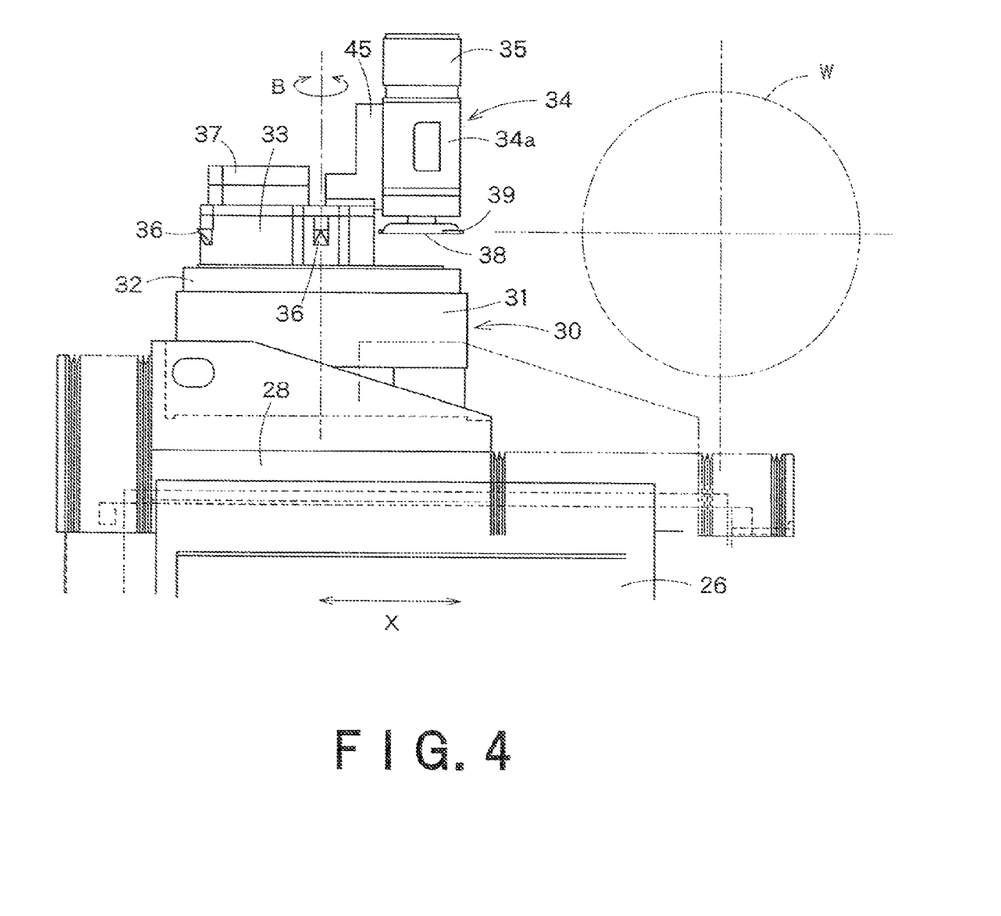
FIG. 4 is a partly sectional front view of the tool swivel of the precision roll turning lathe.
Figure 5:
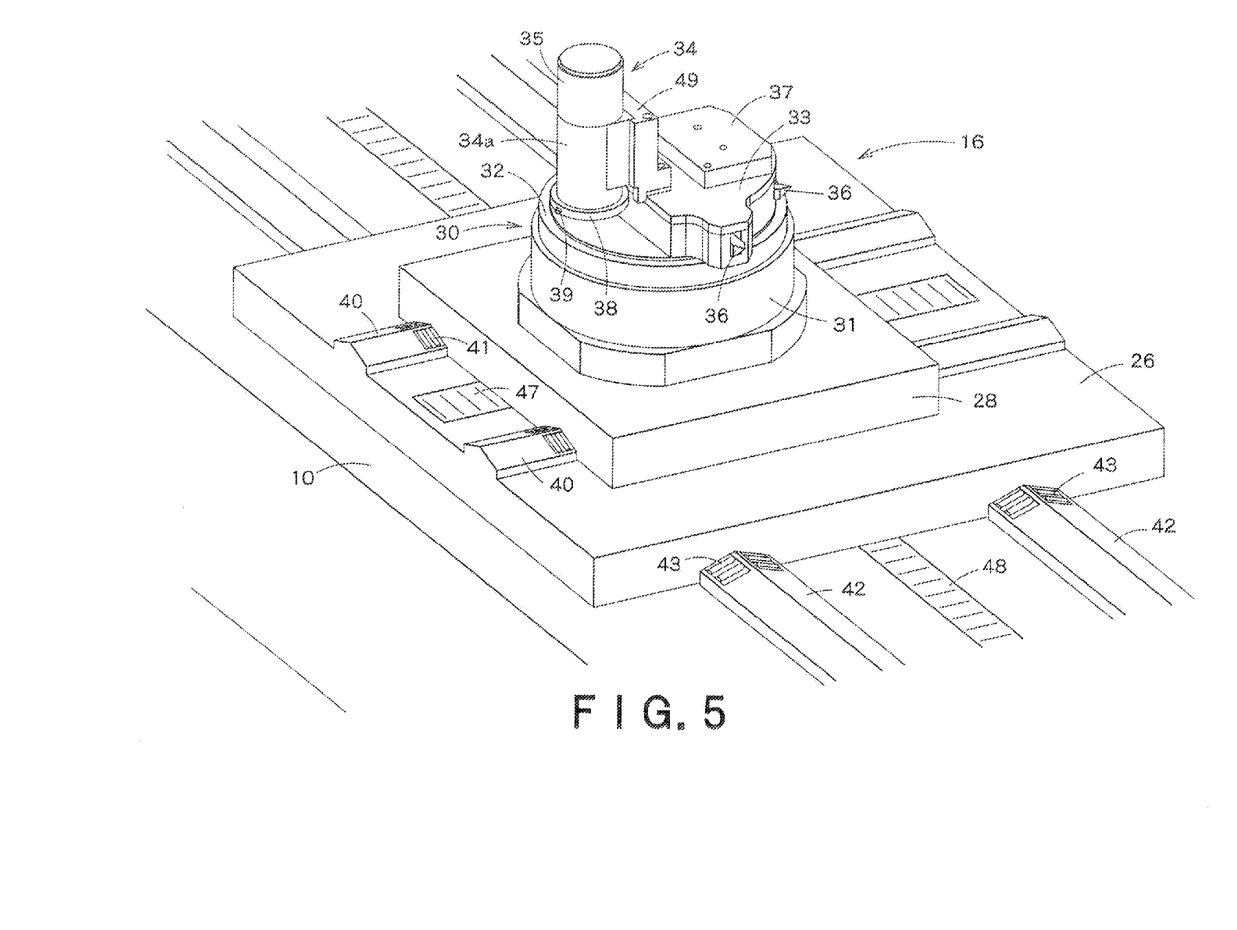
FIG. 5 is a perspective view of the tool swivel.

FIG. 4 shows a front view of the tool swivel 30. FIG. 5 is a diagram showing the tool swivel 30, with covers being removed from the bed 10 and the saddle 26. The tool swivel 30 according to this embodiment includes a swivel body 31 and a top board 32.

A tool post 33 is mounted on one side of the top board 32, and a fly cutter spindle device 34 is disposed at a position on the other side of the top board 32. The fly cutter spindle device 34 is supported by a bracket 45 secured to the tool post 33. The tool post 33 is a tool post generally in a half-column shape, having diamond tools 36 arranged circumferentially at predetermined intervals. In this embodiment three diamond tools 36 are provided in the tool post 33, and each tool 36 can be indexed by swiveling the tool post 33 by 60 degrees together with the top board 32. The number of the diamond tools 36 is, of course, not limited to three. For example, it is possible to provide four diamond tools and index each tool by swiveling the tool post by 90 degrees. A pointed cutting tool which can machine a V-shaped groove is used as the diamond tool 36. A counter weight 37 for balancing the weight of the tool post 33 with the weight of the fly cutter spindle device 34 is placed on the upper surface of the tool post 33.

The fly cutter spindle device 34 will now be described. The fly cutter spindle device 34 includes a body 34a, a servo motor 35, and a cutter holder 38 having a fly cutter 39 attached thereto. A cutter spindle (not shown) is supported by an air bearing in the interior of the body 34a. The cutter spindle is directly driven by the servo motor 35 and rotates at a high speed. The cutter holder 38, which is mounted to the front end of the cutter spindle, is disk-shaped so as to increase the circumferential speed. The fly cutter 39, comprised of a diamond tool, is held on the peripheral surface of the cutter holder 38. In this embodiment the cutter spindle device 34 supports the cutter spindle in a vertical position with respect to the X-axis direction and to the Z-axis direction, and rotates the fly cutter 39 at a high speed in the X-Z plane. The cutting edges of the diamond tools 36, mounted in the tool post 33, lie in the same X-Z plane in which the fly cutter 39 rotates.

Referring to FIG. 5, a pair of X-axis guide rails 40, each having an inverted V-shaped guide surface, extends on the upper surface of the saddle 26. Each X-axis guide rail 40 has a limited-type rolling guide 41 comprised of a large number of rollers held by a retainer. Similarly, a pair of Z-axis guide rails 42, each having an inverted V-shaped guide surface, extends on the upper surface of the bed 10. Each X-axis guide rail 42 likewise has a finite roller bearings 43.

A Z-axis feed drive device for feeding the saddle 26 and an X-axis feed drive device for feeding the table 28 on which the tool swivel 30 is mounted are each comprised of a linear motor. In FIG. 5, reference numeral 47 denotes a permanent magnet series which constitute the linear motor of the X-axis feed mechanism, and 48 denotes a permanent magnet series that extend parallel to the Z-axis guide rails 42.

Referring to FIG. 3, reference numeral 52 denotes an NC unit. The NC unit 52 numerically controls the X axis, Z axis, B axis and C axis. For the C axis of the headstock 12, the NC unit 52 can perform control for carrying out circumferential indexing of a machining start position on the workpiece W (for example, in the case of 16-thread screw cutting, the circumference is divided into 16 equal parts) and control for continuously rotating the main spindle at a predetermined rotating speed. In the case of C axis, a C-axis servo mechanism 54 includes a position controller 55 and a speed controller 56, and a position control loop and a speed control loop are implemented by using the position controller 55 and the speed controller 56 with the encoder 23. Reference numeral 57 denotes a switching section for switching between the workpiece indexing control and the control of continuous rotation of the main spindle 18.

On receipt of an indexing command from the NC unit 52, the position controller 55 makes a comparison with a position feedback from the encoder 23 so as to precisely index a circumferential position on the workpiece. On the other hand, the speed controller 56, on receipt of a command to continuously rotate the main spindle from the NC device 52, makes a comparison with a speed feedback from the encoder to carry out speed control so that the rotating speed of the main spindle will coincide with a command value. Thus, the headstock 12, besides its primary function of continuously rotating the workpiece, can additionally function as a high-precision indexing axis with the same encoder.

A description will now be made of machining of a workpiece using the precision roll turning lather having the above construction.

Figure 6:
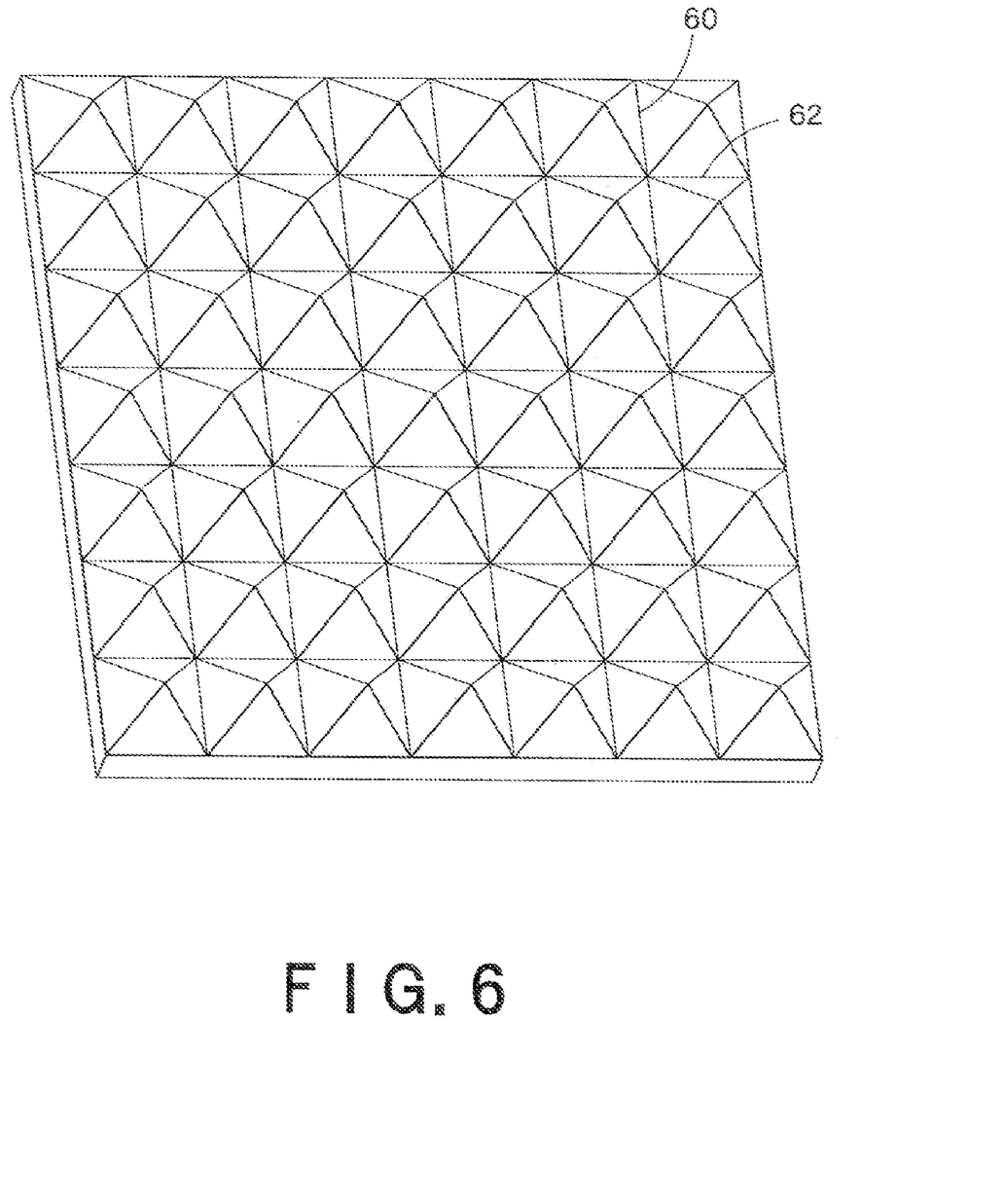
FIG. 6 is a diagram showing a three-dimensional pattern of four-sided pyramids to be machined on a roll.

FIG. 6 is a diagram showing a three-dimensional pattern to be machined in the surface of a roll. As shown in FIG. 6, the three-dimensional pattern consists of four-sided pyramids arranged in a matrix.

Such a pattern of four-sided pyramids can be formed basically by machining transverse grooves 60 and longitudinal grooves 62 in combination. In particular, the transverse grooves 60 are first machined successively at a predetermined pitch, and then the crosswise longitudinal grooves 62 are machined successively at a predetermined pitch, thereby forming the pattern of four-sided pyramids arranged in a matrix in the surface of the roll.

The precision roll turning lathe of this embodiment has the following functions in order to machine a pattern of four-sided pyramids:

The headstock of a conventional roll turning lathe can continuously rotate a workpiece, but cannot index the workpiece. On the other hand, the headstock 12 of the precision roll turning lathe of this embodiment is provided with the C axis which can selectively perform continuous rotation of the workpiece W and indexing of the workpiece.

In addition, by selectively using the tool post 33 and the fly cutter spindle device 34, both provided on the tool swivel 30, in the manner described below, not only the transverse grooves (circumferential grooves) 60 can be cut by continuously rotating the roll W, but the longitudinal grooves (axial grooves) 62 can also be machined with high precision while indexing the workpiece W.

Figure 7A:
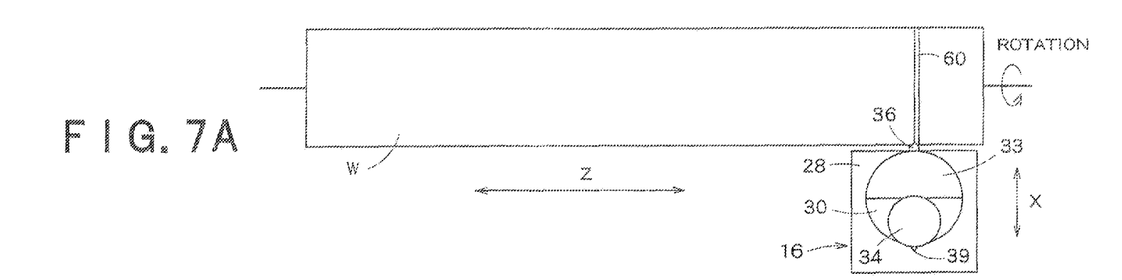
FIGS. 7A through 7C are diagrams illustrating a process for machining four-sided pyramids on a roll.

Machining of the transverse grooves 60 will now be described. Machining of the transverse grooves 60 is carried out in the same manner as usually carried out by a conventional common roll turning lathe. In particular, as shown in FIG. 7A, one of the diamond tools 36 of the tool post 33 is indexed by swiveling the tool post 33 about the B axis. While rotating the workpiece W by means of the servo motor 20 of the headstock 12, the table 28 is fed in the X-axis direction so as to cut the peripheral surface of the workpiece W with the diamond tool 36, thereby machining a transverse groove 60. In this manner, transverse grooves 60 can be machined successively while feeding the diamond tool 36 in the Z-axis direction by a distance equal to the pitch upon machining the next groove.

Figures 7B, 7C:
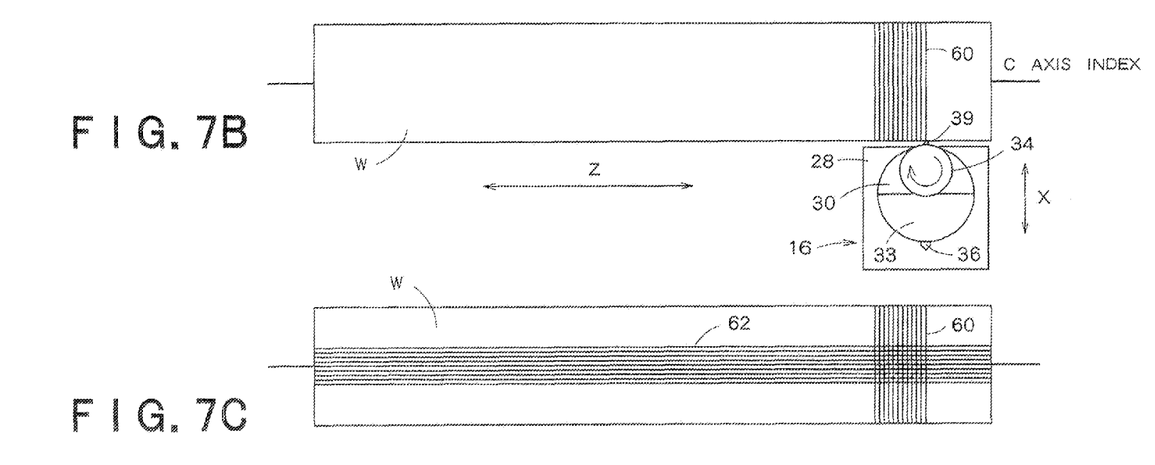

After machining the transverse grooves 60, the fly cutter spindle device 34 is indexed by swiveling the tool swivel 30 about the B axis (FIG. 7B). On the other hand, a circumferential position on the workpiece W at which machining of a longitudinal groove is to be started, is precisely indexed by rotating the workpiece W about the C axis of the headstock 12.

The fly cutter spindle device 34 is actuated to rotate the device 34 at a high speed while the table 28 is fed in the X-axis direction to cut the peripheral surface of the workpiece W with the fly cutter 39. While maintaining the high-speed rotation of the device 34, the carriage 16 is then fed in the Z-axis direction, thereby machining a longitudinal groove 62 with the fly cutter 39. The fly cutter 39 intermittently cuts the workpiece W, producing the longitudinal groove 62. The high-speed rotation of the fly cutter spindle device 34 can provide a desirable cutting speed (about 300 m/min) to the fly cutter 39.

Longitudinal grooves 62 are thus machined successively while sequentially indexing with the C axis circumferential machining start positions on the workpiece W (FIG. 7C). By machining the V-shaped longitudinal grooves 62, intersecting with the V-shaped transverse grooves 60, in the above manner, the pattern of four-sided pyramids shown in FIG. 6 can be machined in the surface of the workpiece W.

With respect to machining of such four-sided pyramids, conventional roll turning lathes have the problem of being incapable of obtaining a sufficient cutting speed to provide a high-precision machined surface of longitudinal grooves 62. In contrast, the roll turning lathe of the present invention, which can obtain an ideal cutting speed owing to the use of the fly cutter spindle device 34, enables satisfactory machining of longitudinal grooves even when high machining precision is required.

Further, a conventional roll turning lathe employs a roller bearing in the headstock. In the case of a roller bearing in which rollers make direct contact with the inner and outer races, the shape accuracy of the rollers affects the motion accuracy of the bearing. It has been difficult with such a roller bearing to satisfy a machining precision as required for a transfer roll for an optical lens. On the other hand, in the case of the hydrostatic oil bearing of the headstock 12 of this embodiment, an oil film is formed between the main spindle 18 and the bearing surfaces of the radial bearing 21 and the thrust bearing 22. The oil film has an averaging effect of reducing the influence of a shape error, which achieves smooth rotation of the main spindle 18 and significantly improves the deflection accuracy of the main spindle 18. This, combined with the above-described effects of the C-axis control and the fly cutter spindle device 34, enables ultraprecision machining. Though in this embodiment a pointed cutting tool is used as the diamond tool 36, it is also possible to use a cutting tool having a round cutting edge. The use of such a cutting tool in carrying out the above-described machining method enables machining of a transfer roll for molding of a cross lenticular lens, for example.

Figure 8:
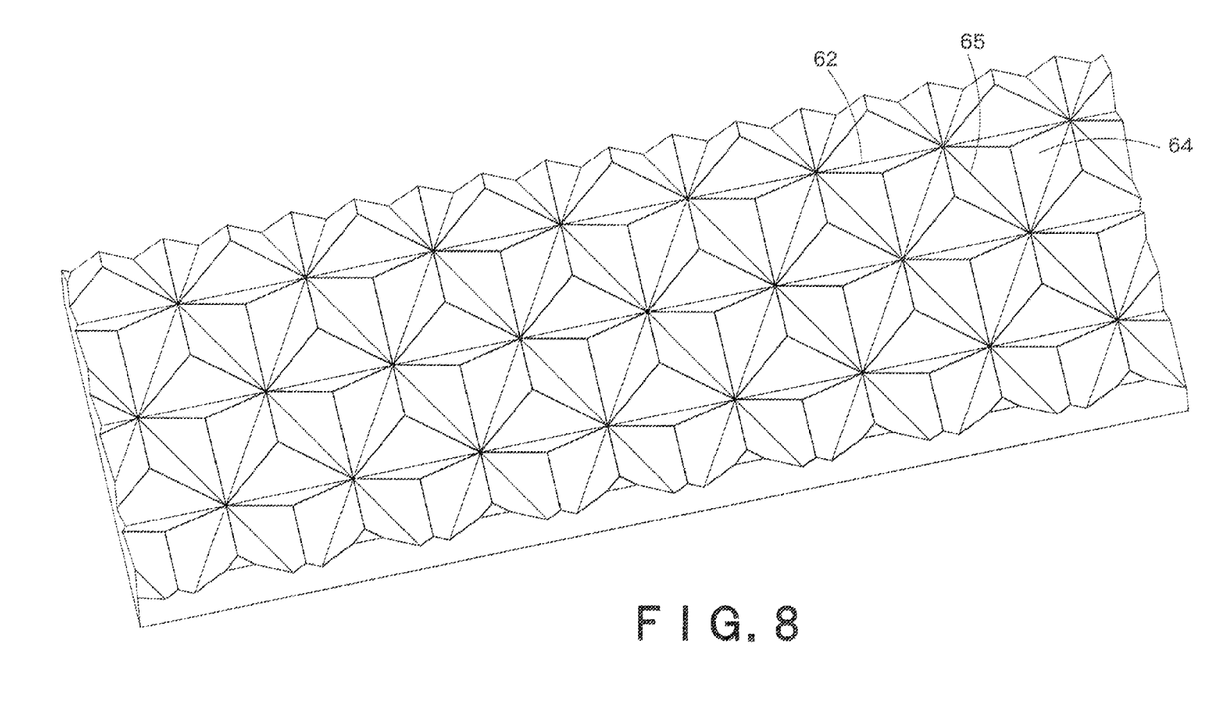
FIG. 8 is a diagram showing a three-dimensional pattern of three-sided pyramids to be machined on a roll.

FIG. 8 shows a three-dimensional pattern of three-sided pyramids arranged in a matrix. Such a pattern of three-sided pyramids can be basically produced by machining V-shaped longitudinal grooves 62 in combination with first V-shaped spiral grooves 64 and second V-shaped spiral grooves 65, spiraling in opposite directions. In this embodiment the first spiral grooves 64 and the second spiral grooves 65 have the same spiral angle.

Figure 9A:
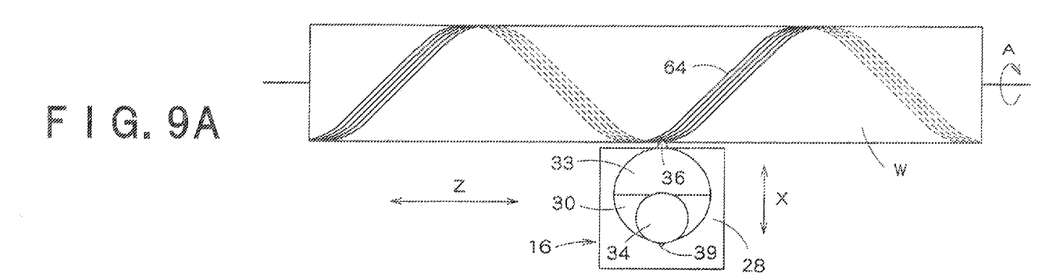
FIGS. 9A through 9C are diagrams illustrating a process for machining three-sided pyramids on a roll.

Machining of the first spiral grooves 64 will now be described. The first spiral grooves 64 can be machined with a diamond tool 36 while rotating the workpiece W in the direction of arrow A shown in FIG. 9A and feeding the diamond tool 36 in the axial direction of the workpiece. In particular, one of the diamond tools 36 of the tool post 33 is indexed, and the workpiece W is rotated continuously by means of the servo motor 20 of the headstock 12. The diamond tool 36 is fed in the X-axis direction to cut into the workpiece W, and then the carriage 16 is fed in the Z-axis direction, thereby machining a first spiral groove 64. The next first spiral groove 64 can be machined in the same manner after indexing the next machining start position on the roll W by rotating the roll about the C axis. For example, in the case of 16-thread screw cutting, 16 machining start positions are set by dividing the circumference of the roll into 16 equal portions. The first spiral grooves 64 can thus be machined successively.

Figures 9B, 9C:
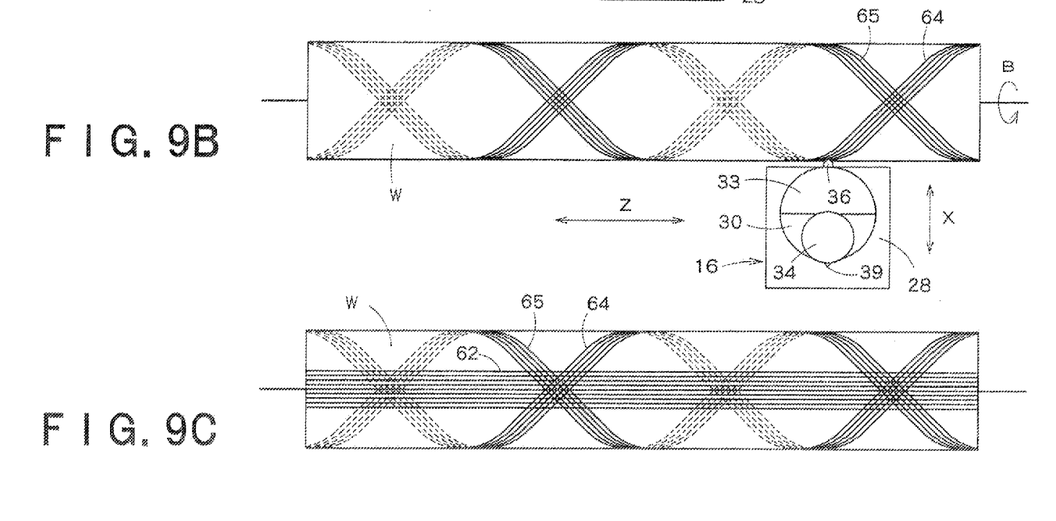

Next, the second spiral grooves 65, intersecting with and reversely spiraling to the first spiral grooves 64, can be machined by reversely rotating the workpiece W in the direction of arrow B shown in FIG. 9F; and, as with the first spiral grooves 64, feeding the headstock 12 in the Z-axis direction.

After thus machining the first spiral grooves 64 and the second spiral grooves successively, longitudinal grooves 62 are machined successively at a predetermined pitch such that the longitudinal grooves 62 pass the intersections of the spiral grooves 64 and 65, whereby the pattern of three-sided pyramids arrange in a matrix, shown in FIG. 8, can be machined in the surface of the workpiece. Machining of the longitudinal grooves 62 can be carried out in the same manner as described above with reference to machining of the pattern of four-sided pyramids, using the fly cutter spindle device 34 and machining the longitudinal grooves at a desirable cutting speed (about 300 m/min), and hence a detailed description thereof is omitted.

According to the above-described manner of machining a pattern of three-sided pyramids by means of the roll turning lathe of the present invention, a machining start position on the workpiece W for machining of a spiral groove can be precisely indexed with the C axis of the headstock 12 and, in addition, the workpiece W can, be continuously rotated at an accurate rotating speed during screw cutting. Furthermore, the use of the hydrostatic oil bearing 21,22 in the headstock 12 can enhance the motion accuracy. The roll turning lathe of the present invention can therefore perform ultraprecision machining of a pattern of three-sided pyramids.

What is claimed is:

1. A precision roll turning lathe, comprising:
    a bed;
    a headstock, mounted on the bed, having a main spindle for rotating a cylindrical workpiece while holding one end of the cylindrical workpiece by means of a chuck;
    a tail stock, mounted on the bed and disposed opposite the headstock, for rotatably supporting the other end of the cylindrical workpiece;
    a carriage including a saddle mounted on the bed movably in the longitudinal direction (Z-axis direction) of the cylindrical workpiece, and a table mounted on the saddle movably in a direction (X-axis direction) perpendicular to the longitudinal direction of the cylindrical workpiece;
    a tool swivel mounted on the table;
    a tool post mounted on the tool swivel and having a plurality of turning lathe cutting tools attached thereto;
    a C-axis controller coupled to the headstock and constructed and arranged to selectively carry out workpiece-indexing by sequentially indexing machine start positions in the circumferential direction when the lathe is machining longitudinal grooves, and selectively carry out continuous rotating of the main spindle at a predetermined rotating speed when the lathe is machining transverse grooves;
    a switch coupled to the C-axis controller and constructed and arranged to cause the C-axis controller to selectively cause workpiece-indexing control and to selectively cause continuous rotation of the main spindle; and
    a fly cutter spindle device that cuts longitudinal grooves on the cylindrical workpiece when the C-axis controller is indexing the start positions, the fly cutter spindle device having a fly cutter and mounted to the tool post.

2. The precision roll turning lathe according to claim 1, wherein the headstock has a hydrostatic bearing, comprised of a radial bearing and a thrust bearing, which supports the main spindle by means of the pressure of a fluid in a contactless manner.

3. The precision roll turning lathe according to claim 1, wherein the headstock has a built-in servo motor for driving the main spindle directly, and an encoder for detecting the revolutions of the main spindle and outputting a detection signal to the C-axis controller.

4. The precision roll turning lathe according to claim 1, wherein the fly cutter spindle device includes a disk-shaped cutter holder holding the fly cutter on its peripheral surface, a body having in its interior an air bearing supporting a cutter spindle, and a servo motor for directly driving the cutter spindle.

5. The precision roll turning lathe according to claim 4, wherein the fly cutter spindle device rotates the fly cutter in the X-Z plane lying at the same height as the turning lathe cutting tools of the tool post.

6. The precision roll turning lathe according to claim 5, wherein the tool post has a tool post body generally in a half-column shape, and the turning lathe cutting tools are attached to the tool post body circumferentially at predetermined intervals.

7. The precision roll turning lathe according to claim 5, wherein a counter weight is placed on the tool post so as to balance the weight of the tool post with the weight of the fly cutter spindle device.

8. The precision roll turning lathe according to claim 1 further comprising a Z-axis rolling guide for guiding the feed of the carriage, said guide extending on the bed parallel to the Z axis and having a guide surface in which a large number of rollers are arranged.

9. The precision roll turning lathe according to claim 1 further comprising an X-axis feed drive device and a Z-axis feed drive device, each comprised of a linear motor.

* * * * *